United States Patent Office 3,849,552
Patented Nov. 19, 1974

---

3,849,552
PROTEASE INHIBITORS AND METHOD FOR PREPARATION
Arne Gosta Jonsson, Sodertalje, and Nils Torsten Lennart Torstensson, Uppsala, Sweden, assignors to Astra Lakemedel Aktiebolag, Sodertalje, Sweden
No Drawing. Continuation of abandoned application Ser. No. 128,493, Mar. 26, 1971. This application June 21, 1973, Ser. No. 372,208
Claims priority, application Great Britain, Apr. 1, 1970, 15,530/70; Jan. 28, 1971, 3,426/71
Int. Cl. A61k 21/00
U.S. Cl. 424—115        2 Claims

ABSTRACT OF THE DISCLOSURE

A new strain of microorganism belonging to the order *Actinomycetales*, genus *Streptomyces* and designated as *Streptomyces violascens* is capable of producing protease inhibitors having unique characteristics and a wide variety of biological and medical uses. These enzyme inhibitors are prepared by cultivating the newly found microorganism under aerobic submerged conditions.

---

This is a continuation of application Ser. No. 128,493, filed Mar. 26, 1971, now abandoned.

The present invention relates to enzyme inhibitors, and more particularly, to protease inhibitors produced by cultivating a newly discovered strain of the genus *Streptomyces*, or mutants thereof. This invention also relates to methods for the preparation, isolation and purification of these novel protease inhibitors.

The increasing use of enzymes and enzyme preparations in various fields of technology has caused a corresponding need for agents capable of controlling the activity of enzymatic processes. Previously, enzyme inhibitors, and in particular inhibitors of proteolytic enzymes, have generally been prepared from mammalian tissue. U.S. Pat. No. 3,532,724 discloses an inhibitor of the protease renin which inhibitor is prepared from mammalian kidney tissue. The preparation of these inhibitors from mammalian tissue has the obvious drawback of limiting the amount of material which can be produced to such an extent that commercial production is not feasible. Accordingly, while there is a great need for enzyme controlling agents, particularly protease inhibitors, production of such agents by fermentation on a large scale has not heretofore been realized.

Protease inhibitors are useful in various fields of medicine. Protease inhibitors are effective in the treatment of various states of shock; in the treatment of pancreatitis; in the treatment of blood clots; and in order to prevent the formation of blood clots. Protease inhibitors are also useful in obstetrics and heart surgery. It is known that the spontaneously occurring disintegration of organs and tissues, such as liver, kidney, heart, pancreas, lung, skin and bonemarrow, after death may be suppressed by substances capable of inhibiting proteolytic activity which are obtained from mammalian tissue or plants. As a result, protease inhibitors are useful to preserve organs and tissues during their transplantation. Similarly, certain nutrition agents may be preserved from disintegration and destruction caused by proteolytic enzymes by treating them with protease inhibitors.

A field of particular interest where the protease inhibitors according to the present invention may be used is the treatment of states of elevated fibrinolytic activity in body fluids, such as blood and urine in mammals including man. Elevated fibrinolytic activity may result from pathologic conditions, such as pancreatitis, but may also be externally induced, for example by administration of fibrinolytic agents such as Protease I described by Bergkvist in U.S. Pat. No. 3,281,331. Protease I may be used clinically for dissolution of blood clots and must be administered in carefully calculated dosages. Heretofore, it has not been possible to counteract the proteolytic activity of Protease I once it has been administered to the patient in excessive amounts. The protease inhibitor according to the present invention has surprisingly appeared to be active also against Protease I and may be used as an antidote in cases of overdosage with Protease I.

Protease inhibitors are also useful in other fields, for example in enzymology, where they serve as natural tools with which to probe the active centers of proteases, for isolation of enzymes, and for purification of enzymes in a simple one-step procedure. Inhibitors may also be of importance in ecological studies. In technical processes, where a rapid and mild inhibition of proteolytic enzymes is wanted, there is a need for cheap inhibitors. Another field where protease inhibition may be used is food technology, particularly for fish processing, for example in the production of fishmeal and products derived therefrom.

The present invention makes possible large scale production of protease inhibitors with valuable properties. It has been found that a newly discovered strain of the genus *Streptomyces*, and mutants thereof, may be cultivated to produce enzyme controlling agents, in particular protease inhibitors.

The microorganism used in the production of the protease inhibitors of the present invention has been isolated from a soil sample collected in Arkelstorp, Sweden. Taxonomic observations indicate that this microorganism belongs to the order *Actinomycetales*, genus *Streptomyces*. It was identified as *Streptomyces violascens*. A subculture of this variety can be obtained from the permanent collection of the United States Department of Agriculture, Agricultural Research Service, Northern Utilization Research and Development Division, 1815 North Peoria Street, Peoria, Ill. 61604, USA. The accession number for the subculture in this repository is NRRL 3859.

The present invention relates to a strain *Streptomyces violascens* (NRRL 3859) and mutants thereof, heretofore unknown, which are capable of producing protease inhibitors showing the unique characteristics and qualities hereinafter described. The invention also relates to a method of producing preparation containing protease inhibitors obtained by cultivating the new strain *Streptomyces violascens* (NRRL 3859) under aerobic conditions in a suitable nutrient medium. The strain may also be cultivated under surface conditions.

In a preferred embodiment of the process which suitably may be used for the production of the protease inhibitors of the present invention, the microorganism is grown under aerobic submerged conditions in a nutrient medium which comprises an assimilable source of carbon, nitrogen and inorganic salts. Cultivation conditions such as time, temperature and hydrogen ion concentration may be varied broadly without substantially effecting the growth of the microorganism. At the conclusion of the growth period, the protease inhibitor material may be recovered from the mash by a number of methods, such as filtering, centrifugation of the mash, precipitation of impurities with acetone, and freeze-drying or spray-drying the resulting solution. The protease inhibitors may be further recovered from the preparation by dialyzation, ultrafiltration and gel filtrations.

A wide variety of substances may be used as sources of carbon in the nutrient medium. These carbon sources may be either soluble or insoluble in water, it being desirable only that the compounds used be readily assimilable by the organism. Examples of suitable carbon sources include monosaccharides such as glucose, fructose, and pentoses such as arabinose, disaccharides such as sucrose, maltose and lactose, trisaccharides such as raffinoe, and polysaccharides such as starch and cellulose. Higher alcohols such as glycerol and inositol are also suitable carbon sources.

Nitrogen in an assimilable form may be provided by animal or vegetable proteins such as soybean meal, casein, peptones, polypeptides, amino acids, or the like.

The nutrient inorganic salts which can be incorporated into the medium may be selected from the group consisting of salts capable of yielding ions such as ammonium, sodium, potassium, calcium, magnesium, phosphate, chloride, sulphate, nitrate and the like. For optimum growth of the microorganism, it is preferred to add a combination of $K_2HPO_4$, $NaNO_3$ and $MgSO_4 \cdot 7 H_2O$ to the culture medium. Essential trace elements may also be included in the culture medium. Trace elements are, however, usually present as impurities in other components in the culture medium.

For maximum growth and production of the new microorganism of the present invention the culture medium, prior to inoculation, should be adjusted to a pH between about 5 and 8. The pH at the end of the growth period will depend on the buffering substances present and on the initial pH. Adjustment of the pH may be accomplished with any suitable acid such as hydrochloric acid or with phosphate, citrate or acetate buffer or any other suitable material which would bring the pH within the desired range.

The temperature of the nutrient medium during fermentation of the actinomycete may be maintained within the interval from about 10° C. to about 40° C. and may advantageously be maintained at 30° C. or lower, preferably from about 15° C. to about 30° C.

The time required for the production of a maximum amount of protease inhibitors may be varied, depending upon the temperature and the nature of the particular ingredients employed in the nutrient medium. However, a period from about 10 to about 100 hours is usually considered adequate.

Anti-foaming agents may be added to the fermentation medium. Examples of suitable anti-foaming agents include soybean oil, castor oil, sulfonated oils, lard oil, brominated castor oil, and silicones.

PROTEASE SCREENING PROCEDURE

The following method was used for screening for protease inhibitors. A double layer of agar in Petri dishes (90 mm.) was used. The bottom layer consisted of skim-milk agar, which contained skim-milk powder (Semper AB, Stockholm, Sweden), 1 and agar No. 3 (Oxoid), 12 g./liter of 0.02 M phosphate buffer, pH 7.5. After spreading of 0.1 ml. of diluted sample on the surface, the plate was incubated for 2 days at 24° C. After this time, it was cooled at 2° C. for 1 hr. Protease from *Alternaria tenuissima*, 1 enzyme unit/liter (Jönsson, Appl. Microbiol. *15* (1967) 319–324) was sterilized by filtration and added to an agar solution (43° C.), containing 12 g. of agar per liter of the same phosphate buffer, to give a protease activity of 0.1 enzyme unit/liter. Thereafter, this agar was poured on top of the bottom layer. The plate was incubated for additional 24 hrs. at 24° C. The skim milk agar then turned transparent, except around colonies producing protease inhibitors. These colonies were used for inoculation of 200 ml. Erlenmeyer flasks, containing 25 ml. of Nutrient Broth (Oxoid). The flasks were incubated at 24° C. as shake cultures (180 rev./min., model G 10 shakes; New Brunswick Scientific Co., New Brunswick, N.J.). After 3 days, the trypsin inhibition activity in the culture filtrate was estimated as follows:

Crystallized salt free trypsin (3215 N.F. Units per mg., Armour Pharmaceutical Company Ltd., Eastbourne, England) was used for the estimation of inhibitor effect. 0.2 ml. culture filtrate from the shake culture and 0.8 ml. trypsin solution, containing about 5 µg. trypsin, was incubated for 30 min. at 24° C. Blanks were incubated with 0.8 ml. trypsin solution and 0.2 ml. distilled water. The remaining free trypsin, not inhibited, was estimated as caseolytic activity at pH 9.5 by a modification of Anson's procedure (Jönsson, Appl. Microbial. *15* (1967) 319–324). Because the correlation between inhibition and concentration of inhibitor is linear only to a certain limit, dilutions of culture filtrate to give about 50 percent inhibition of the trypsin were used. Inhibitor activity was calculated as the amount of trypsin (µg.) that was inhibited to 50 percent by 1 µl. of culture filtrate. The data provided in this disclosure relating to inhibitor activity refer to this 50 percent inhibition.

A similar method was used for estimation of inhibition of other proteases, for example, chymotrypsin (crystalline alpha-chymotrypsin from bovine pancreas, BDH).

TAXONOMIC IDENTIFICATION OF THE MICROORGANISM

The recommendations according to Waksman, *The Actinomycetes* (1950) and the system of classification in *Bergey's Manual of Determinative Bacteriology*, VIII Ed. (1957) were followed for the taxonomic identification of the microorganism. For identification of species, the recommendations of The International Streptomyces Project (Shirling & Gottlieb, Int. J. Syst. Bacteriol. *16* (1966) 313–340; Int. J. Syst. Bacteriol, *18* (1968) 69–189; Int. J. Syst. Bacteriol. *18* (1968) 279–399; Int. J. Syst. Bacteriol. *19* (1969) 391–512); were followed. The following results were obtained:

(1) The microorganism grew with a branching mycelium-like structure and the hyphae were about 1.0 µm. in diameter. The vegetative mycelium remained undivided. Conidia were produced in chains from aerial hyphae.

(2) The organism had the following properties at cultivation on various media:

(a) Spore morphology: Mature spore chains comprised 10 to 50 or more spores per chain. This morphology was seen on yeast-malt, oatmeal, salt-starch, and glycerol-asparagine agar. Spore surface was spiny.

(b) Color of colony: Aerial mass color in the white color-series on yeast-malt agar, salts-starch agar, and glycerol-asparagine agar and in the violet color series on oatmeal agar.

(c) Reverse side of colony: No distinct pigments (pale yellow to light brown) on yeast-malt agar, oatmeal agar, salts-starch agar, and glycerol-asparagine agar.

(d) Color in medium: Melanoid pigments were found in peptone-yeast iron agar, tyrosine agar, and tryptone-yeast broth. Pigments other than melanoids were not produced in yeast-malt agar, oatmeal agar, salts-starch agar, and glycerol-asparagine agar.

(e) Carbon utilization: D-glucose, L-arabinose, i-inositol, D-fructose, raffinose, and cellulose were utilized for growth. No growth or only traces of growth on sucrose, D-xylose, D-mannitol or rhamnose.

(f) Appearance on further media is given in Table I.

TABLE I

Appearance of the strain of *Streptomyces* on various media

| Medium | Appearance of colonies |
|---|---|
| Czapek's agar | Separate white colonies. |
| Glucose-asparagine agar | Separate white colonies. |
| Starch-nitrate agar | Separate grayish-beige colonies. |
| Nutrient agar | Separate grayish-beige colonies. |
| Sabouraud agar | Separate grayish-beige colonies. |
| Potatoe | Separate live-green colonies. |
| Carrot | Separate live-green colonies. |

(3) Gelatine is not liquefied. Gram stain: positive. Not acid-fast.

(4) The growth velocity of mycelium was maximal at about 28° C. At 5° C. there is a slight growth whereas at 40° C. there is no growth of mycelium.

(5) The maximal production of protease inhibitor occurred at a lower temperature than the maximal growth of mycelium.

(6) The trypsin inhibiting capacity of the isolated microorganism of the present invention, measured as $\mu$g. trypsin inhibited to 50% by 1 $\mu$l. culture filtrate, was $>0.1$ $\mu$g./$\mu$l.

These taxonomic observations lead to the determination that the new microorganism belongs to the order *Actinomycetales*, genus *Streptomyces*. It is identified as *Streptomyces violascens*.

Various types of media were tested in studies of the inhibitor production from the *Streptomyces* strain of the present invention. Samples were withdrawn and assayed after 2, 4 and 8 days of incubation. Three synthetic media, used for actinomycetes, gave little inhibitor activity, 0.04 $\mu$g. of trypsin inhibited to 50% per $\mu$l., or less, after 4 days of incubation: (1) Czapek's sucrose medium; (2) starch-nitrate medium; and (3) synthetic lactate medium (Waksman, 1950, pp. 193–197, No. 18, 19, 26). Growth was also relatively sparse in these media with the exception of the starch-nitrate medium. Higher yields were attained in nutrient broth (Oxoid), glucose-peptone medium (Sabouraud), and in a milk medium (Dion, 1950), a maximum of about 0.3 $\mu$g. of trypsin inhibited to 50% per $\mu$l. after 4 days.

The highest yields were attained from a medium containing spray-dried protein powder (Bast Bovine Cell Tissue, C. E. Bast's Successors Ltd., Copenhagen, Denmark) which contained (g. per liter in distilled water): protein powder, 18; glucose, 10; $K_2HPO_4$, 1.0; KCl, 0.5; $NaNO_3$, 3.0; $MgSO_4 \cdot 7H_2O$, 0.5; and $FeSO_4 \cdot 7H_2O$, 0.01. The effect of various concentrations of protein powder in the medium was, therefore, studied. This concentration of protein powder resulted in an inhibitor concentration of 1.2 $\mu$g. of trypsin inhibited to 50% per $\mu$l. of culture filtrate after 72 hrs. of incubation. The other concentrations studied gave much lower inhibitor production. The typical shift in pH in connection with growth in this medium is seen in Table II. Similar yields were obtained when KCl, $MgSO_4$ and $FeSO_4$ were excluded.

TABLE II

[Production of inhibitor in a protein powder medium]

| Incubation time (hrs.) | pH | Trypsin inhibition ($\mu$g./$\mu$l.) |
|---|---|---|
| 0 | 6.7 | 0.00 |
| 20 | 6.4 | 0.37 |
| 30 | 5.2 | 0.42 |
| 44 | 4.7 | 0.84 |
| 54 | 4.9 | 0.92 |
| 72 | 7.0 | 1.23 |

The production of protease inhibitor was also performed in 8-liter fermentors. The resulting inhibitor activity was found to be lower in these fermentors than in shake-cultures with the same medium. This may, at least partly, be caused by the rapid increase in pH observed in fermentors. When pH was prevented from increasing over pH 5 by automatic additions of 0.5 M HCl, higher activity was observed. After a lag phase of about 8 hrs. the actinomycete grew for additional 28 hrs. The inhibitor production almost parallelled growth and reached a maximum concentration of 0.9 $\mu$g. (trypsin per $\mu$l. after 29 hrs. of incubation. The automatic foaming control required approximately 300 ml. of antifoam emulsion when pH was allowed to vary freely, but at pH 5 relatively small amounts were used of about 100 ml. per fermentor after 40 hrs.

The components of the protein powder medium described above were used for cultivation at various pH values, but dissolved in a citrate-phosphate buffer (0.02 and 0.04 M in regard to citric acid and $Na_2HPO_4$, respectively). PH was adjusted to 2.8–9.9 with 6 N HCl or 4 N NaOH.

The effect of starting pH in the medium on growth and production of protease inhibitor as estimated after 120 hrs. of incubation is seen in Table III. As is seen in Table III a starting pH between 6 and 7 was most favorable for the process. However, final pH was 1 to 2 units higher at the end of the experiment, despite the buffering capacity of the medium. PH control to pH 5 during the latter part of the process seemed favorable in fermentors, where maximum activity was attained after 28 hrs. of cultivation.

TABLE III

[Effect of starting pH on growth and production on inhibitor in a protein powder medium]

| Starting pH | Mycelium formed (g./l.) | Trypsin inhibition ($\mu$g./$\mu$l.) |
|---|---|---|
| 2.80 | 0.24 | 0.00 |
| 3.85 | 0.25 | 0.00 |
| 5.65 | 5.45 | 1.35 |
| 6.65 | 4.65 | 1.75 |
| 7.40 | 2.42 | 1.03 |
| 9.90 | 0.61 | 0.00 |

The effect of temperature on production of the protease inhibitor in quiescent flasks is shown in Table IV.

TABLE IV

[Effect of temperature on production of inhibitor in a protein powder medium after 10 and 24 days of surface growth]

| Temperature (° C.) | Trypsin inhibition ($\mu$g./$\mu$l.) | |
|---|---|---|
| | 10 days | 24 days |
| 4.6 | 0.05 | 0.28 |
| 8.3 | 0.12 | 0.28 |
| 15.5 | 0.25 | 0.37 |
| 19.9 | 0.26 | 0.31 |
| 24.0 | 0.17 | 0.32 |
| 28.0 | 0.13 | 0.27 |
| 32.4 | 0.19 | 0.27 |
| 37 | 0.02 | 0.02 |
| 44.0 | 0.00 | 0.00 |

As seen in Table IV the maximum inhibitor activity was attained at about 15° C. to 20° C. This was particularly so at the earlier harvest, after 10 days of surface growth. At 37° C., growth and production were close to zero.

The purification procedure for the protease inhibitors may be carried out by removing of the mycelium from the culture by suction filtering, freeze-drying of the culture filtrate, and methanol extraction of the freeze-dried powder. After an addition of distilled water to the extract the methanol was evaporated by vacuum, and the water solution was dialyzed and ultrafiltered. Finally the fraction in the ultrafiltrate which contains the inhibitors was separated by gel filtration into two fractions, one fraction containing a trypsin inhibitor without chymotrypsin inhibiting capacity and one fraction containing a chymotrypsin inhibitor without trypsin inhibiting capacity. Both the protease inhibitors of the present invention were found to be dialyzable and to be able to inhibit the activity of Protease I from *Aspergillus oryzae* (Bergkvist, U.S. Pat. No. 3,281,331). They inhibited partly the proteolytic activity in fish and fish products. No bacteriostatic or fungistatic effects were observed. The chymotrypsin inhibitor inhibited α-, β-, γ- and δ-chymotrypsin. Both inhibitors were stable at heating to 100° C. for 20 min. They were also stable in solutions between pH 2 and pH 9 and the trypsin inhibitor showed no isoelectric point under pH 10. The molecular weights were about 1,400, and 1,000 or lower, for the trypsin and chymotrypsin inhibitor, respectively, as estimated by gel filtration on Sephadex® G-50.

In clinical practice, a pharmaceutical preparation containing a therapeutically effective dose of the protease inhibitors according to the present invention may be administered orally or parenterally. Dosages must be carefully adjusted depending on the individual requirements of each patient.

The following Examples are provided only to illustrate the invention and are not intended to limit its scope in any way.

CULTIVATION OF THE MICROORGANISM NRRL 3859

Example 1

A suspension of the microorganism NRRL 3859 and nutrient broth (Oxoid Ltd., London, England) was inoculated on a 10-ml. nutrient agar slant (Oxoid). After 5 days at 28° C., 10 to 20 mm.² portions of the culture were transferred to 200 ml. Erlenmeyer flasks with 50 ml. of nutrient broth (Oxoid) and incubated at 24° C. on a rotary shaker (180 rev./min.). After 4 days, 5 ml. of this culture was used to inoculate each 1 liter Erlenmeyer flask containing 250 ml. of the various media for test in shake cultures at 24° C. The yields of inhibitor activity obtained after 96 hours of cultivation were assayed. Three synthetic media, Czapek's sucrose medium, starch-nitrate medium, lactate medium (Waksman, 1950, pp. 193–197, No. 18, 19, 26) gave little inhibitor activity, 0.04 μg. of trypsin inhibited to 50% per μl. or less. Growth was also relatively sparse in these media with the exception of the starch-nitrate medium. Higher yields were attained in nutrient broth, glucose-peptone medium (Sabouraud), and in a milk medium (Dion, W. M., Can. J. Research, C, 28 (1950) (577–585). 0.3 μg. of trypsin was inhibited to 50% per μl. The highest yields were attained from a medium containing spray-dried protein powder, which contained (g. per liter in distilled water): protein powder (Bast Bovine Cell Tissue, C. E. Bast's Successors Ltd., Copenhagen, Denmark) 18; glucose, 10; K₂HPO₄, 1.0; NaOH₃, 3.0; and MgSO₄·7H₂O, 0.5, 1–2 μg. of trypsin were inhibited to 50% per μl.

Example 2

Nutrient agar slants containing the microorganism NRRL 3859 were used for direct inoculation of 1 liter Erlenmeyer flasks containing 250 ml. of protein powder medium. The flasks were incubated at 24° C. on a rotary shaker (180 rev./min.). Maximum trypsin inhibition (1 μl. inhibited 1.90 μg. of trypsin to 50%) and chymotrypsin inhibition (1 μl. inhibited 2.29 μg. of chymotrypsin to 50%) was attained after 112 hours of cultivation.

Example 3

Commercial glass-bodied fermentors with stainless-steel equipment and a maximum capacity of 10 liter (Model FL 100, Biotec AB, Bromma, Sweden) were used for cultivation of the microorganism NRRL 3859 on an 8 liter scale. In these cases the organism was transferred from the nutrient agar slant to a 1 liter Erlenmeyer flask containing 250 ml. of the same medium as was used in the fermentor. After incubation on a shaker as above 100 ml. were used for inoculation of each fermentor. The fermentors were connected with an instrumentation panel Model LP 100 of the same firm (Methods in Microbiology (1969), p. 498).

The following conditions were applied to the fermentor cultures: protein powder medium; temperature, 28° C.; agitation, 500 rev./min.; aeration, 0.6 liter of air per liter of medium per min. Silicone antifoam emulsion RD (Midland Silicones Ltd., Reading, England), diluted 1:10, was added automatically as required, by an antifoam control unit (Model LP 100–22, Biotec AB Bromma, Sweden). Maximum trypsin inhibition (1 μl. inhibited 0.48 μg. trypsin to 50%) was obtained after 24 hours of cultivation.

Example 4

Pilot plant equipment, as in Example 3, were used in the cultivation of the strain NRRL 3859.

The following conditions were applied to the fermentor cultures: protein powder medium; temperature, 28° C.; agitation, 500 rev./min.; aeration, 0.6 liter of air per liter of medium per min. Silicone antifoam emulsion RD, diluted 1:10, was added automatically as required. The pH was prevented from increasing over pH 5 by automatic additions of 0.5 M HCl. Maximum trypsin inhibition (1 μl. inhibited 0.90 μg. trypsin to 50%) was obtained after 29 hours of cultivation.

Example 5

Pilot plant equipment, as in Example 3, were used in the cultivation of the strain NRRL 3859.

The following conditions were applied to the fermentor cultures: protein powder medium; temperature, 18° C.; agitation, 500 rev./min.; aeration, 0.6 liter of air per liter of medium per min. Silicone antifoam emulsion RD, diluted 1:10, was added automatically as required. Maximum trypsin inhibition (1 μl. inhibited 1.03 μg. trypsin to 50%) was obtained after 62 hours of cultivation.

Example 6

Pilot plant equipment, as in Example 3, were used in the cultivation of the strain NRRL 3859.

The following conditions were applied to the fermentor cultures; protein powder medium; temperature, 18° C.; agitation 500 rev./min.; areation, 0.6 liter of air per liter of medium per min. Silicone antifoam emulsion RD, diluted 1:10, was added automatically as required. The pH was prevented from increasing over pH 5 by automatic additions of 0.5M HCl, Maximum trypsin inhibition (1 μl. inhibited 1.92 μg. of trypsin to 50%) was attained after 71 hours of cultivation.

PURIFICATION OF THE PROTEASE INHIBITOR PREPARATION

Example 7

The culture, obtained according to Examples 1–6, was filtered by suction. The culture filtrate was evaporated to a tenth of its volume by vacuum. To the concentrated culture filtrate was added 50% by volume of cold acetone. The precipitate was removed by centrifugation, and the acetone in the supernatant evaporated by vacuum. At least a tenfold purification of the protease inhibitor fraction contained in the crude culture filtrate was obtained by this process. The resulting inhibitor solution was freeze-dried with only a moderate loss of activity.

Example 8

The culture, obtained according to Examples 1–6, was filtered by suction. After addition of polyvinylpyrolidone (Polyclar® AT, 1 g. per 100 ml., General Aniline & Film Corp., New York, N.Y.) the solution was freeze-dried. The dry powder was extracted with methanol. After an addition of one fifth by volume of distilled water to the extract, the methanol was evaporated by vacuum. The remaining solution was poured into a dialysis tub, which was placed into distilled water at 5° C. overnight. The solution outside the dialysis bag was concentrated by ultrafiltration through an UM-2 membrane (Amicon N.V., The Hague, Holland). Finally the ultrafiltrate was separated by gel filtration on Sephadex® G-15 into two fractions, one fraction containing a trypsin inhibitor and one fraction containing a chymotrypsin inhibitor.

Recoveries in the various purification steps are seen in Table V.

TABLE V

[Purification of protease inhibitors from *Streptomyces violascens* NRRL 3859]

| Treatment | Inhibitor activity (percent) | |
|---|---|---|
| | Trypsin inhibitor | Chymotrypsin inhibitor |
| Filtration of culture | 100 | 100 |
| Freeze-drying and methanol extraction | 85 | 77 |
| Dialysis | 69 | 66 |
| Ultrafiltration | 63 | 58 |
| Gel filtration | 33 | 21 |

PRESERVATION OF HERRING PREPARATION

Example 9

110 g. of herring was homogenized in an Ultra Turrax (Janke & Kunkel KG) with 110 ml. of distilled water. The suspension was centrifuged for 50 min. at 9,000 r.p.m. The protease activity in the supernatant, with and without addition of inhibitors, was assayed as caseolytic activity at pH 5.0, 7.2 and 9.5 by a modification of Anson's procedure (Jönsson, Appl. Microbiol. *15* (1967) 319–324). The inhibitors were added as culture filtrate with a capacity of inhibiting 1.8 μg. of trypsin to 50% per ul. Maximal inhibition was attained with an addition of about 250 ml. of the inhibitor solution per kg. of herring, which contained 19.4, 18.6 and 23.6 milliunits of protease activity per kg. as estimated at pH 5.0, 7.2 and 9.5, respectively. The maximal inhibition was 20, 15 and 70%, respectively, at the various pH values.

INHIBITION OF PROTEOLYTIC ACTIVITY ON A PROTEASE PREPARATION OBTAINED AT CULTIVATION OF CEPHALOSPORIUM ATCC 11 550.

Example 10

A suitable amount of protease obtained at cultivation of Cephalosporium ATCC 11 550 was dissolved in 0.2 M phosphate buffer of pH 7.4. The protease inhibitor preparation according to the present invention was dissolved in a separate solution of the same buffer in a concentration of 10 mg./ml. Thereafter 0.1 ml. of the protease solution and increasing amounts of the inhibitor solution was mixed and buffer up to 3 ml. was added. The mixture thus obtained was incubated for 15 minutes at 37° C., whereafter 3 ml. of a 3% casein solution of pH 7.4 was added. Casein analyses for proteolytic activity were carried out as described by Bergkvist, Acta Chem. Scand. *17* (1963) 1521–1540. 15 g. of casein (Merck, Hammarsten casein) was suspended in 400 ml. of water under vigorous stirring. Sodium hydroxide was added until dissolution. The pH was adjusted to the desired pH and the solution was diluted to 500 ml. with water. 3 ml. of casein solution was mixed in test tubes with 3 ml. of the incubated solution mentioned above.

Parallels of the test tubes were used. 2 ml. from the tubes were pipetted immediately into 3 ml. of 10% trichloroacetic acid. The rest of the contents of the test tubes were incubated for exactly 30 minutes whereafter 2 ml. were withdrawn and added to 3 ml. 10% trichloroacetic acid.

After standing for at least 30 minutes at room temperature the tubes were centrifuged and filtered through small funnels stoppered with a lose plug of cotton. The absorbance at 280 nm. of the filtered centrifugates was measured. Optical pathway: 1 cm.

The difference $UV_{30}-UV_0$ in absorbance, that is the difference in absorbance measured on samples after 30 minutes incubation, $UV_{30}$, and measured on samples without incubation, $UV_0$, is a measure of the proteolytic activity. Thus, decreasing values of $UV_{30}-UV_0$ means increasing inhibition of proteolytic activity. A solution of 1 mg. protease preparation, obtained from Cephalosporium ATCC 11 550, per ml. was used. 0.1 ml. of this solution was used for the analysis. The results are reported in Table VI:

TABLE VI

Inhibition of proteolytic activity in protease preparations obtained from Cephalosporium ATCC 11 550]

| Amount of inhibitor added | | Absorbance | | Difference in absorbance $UV_{30}-UV_0$ arbitrary units | Percent inhibition |
|---|---|---|---|---|---|
| Volume, ml. | Weight, mg. | After 30 min. incubation ($UV_{30}$) arbitrary units | At 0 min. incubation ($UV_0$) arbitrary units | | |
| 0 | 0 | 0.350 | 0.138 | 0.212 | 0 |
| 0.025 | 0.25 | 0.298 | 0.138 | 0.160 | 25 |
| 0.050 | 0.50 | 0.282 | 0.158 | 0.124 | 41 |
| 0.100 | 1.00 | 0.280 | 0.190 | 0.090 | 58 |
| 0.250 | 2.5 | 0.362 | 0.292 | 0.070 | 67 |
| 0.500 | 5.0 | 0.515 | 0.465 | 0.050 | 76 |

It is seen from the results given in Table VI that about 0.55 mg. of the tested protease inhibitor preparation will cause a 50% inhibition of the proteolytic activity in 0.1 mg. of the Cephalosporium protease preparation.

INHIBITION OF PROTEOLYTIC ACTIVITY ON A BERGKVIST PROTEASE I PREPARATION OBTAINED BY CULTIVATION OF *ASPERGILLUS ORYZAE*

Example 11

The test on inhibition of Protease I was performed in the same manner as described in Example 10 for a protease preparation obtained from Cephalosporium ATCC 11 550. A solution of 0.3 mg. per ml. of Protease I preparation obtained from *Aspergillus oryzae* was used. 0.1 ml. of the solution was used for the analysis and the results are reported in Table VII:

TABLE VII

[Inhibition of proteolytic activity in protease preparations of Protease I obtained from *Aspergillus Oryzae*]

| Amount of inhibitor added | | Absorbance | | Difference in absorbance $UV_{30}-UV_0$ arbitrary units | Percent inhibition |
|---|---|---|---|---|---|
| Volume, ml. | Weight, mg. | After 30 min. incubation ($UV_{30}$) arbitrary units | At 0 min. incubation ($UV_0$) arbitrary units | | |
| 0 | 0 | 0.457 | 0.075 | 0.382 | 0 |
| 0.250 | 0.25 | 0.372 | 0.086 | 0.286 | 25 |
| 0.050 | 0.50 | 0.318 | 0.102 | 0.216 | 43 |
| 0.100 | 1.00 | 0.264 | 0.126 | 0.138 | 64 |
| 0.250 | 2.50 | 0.277 | 0.276 | 0.060 | 84 |
| 0.500 | 5.0 | 0.386 | 0.358 | 0.028 | 93 |

It is seen from the results reported in Table VII that about 0.55 mg. of the protease inhibitor preparation will cause 50% inhibition of the proteolytic activity in 0.030 mg. of the Protease I preparation.

Thus, according to the present invention, a commercially acceptable method for producing protease inhibitors in large quantities is provided. Many variations of this invention will readily suggest themselves to those skilled in the art. In this regard nothing in the preceding disclosure is intended to limit the scope of the invention as defined by the following claims.

We claim:

1. A process for preparing a preparation containing protease inhibitors which comprises cultivating *Streptomyces violascens*, NRRL 3859, under aerobic conditions in a nutrient medium containing sources of carbon, nitrogen, and nutrient inorganic salts in assimilable form, for a period of about 10 to 100 hours until a sufficient amount of protease inhibitors is produced, said medium having a pH, prior to inoculation, ranging between about 5 and 8, and a temperature during fermentation ranging from about 10° to about 40° C.

2. A protease inhibitor preparation prepared by the process according to claim 1.

References Cited

Miller: The Pfizer Handbook of Microbial Metabolites, McGraw-Hill Book Co., Inc., New York, N.Y., 1961, pp. 394, 611 and 612.

JEROME V. GOLDBERG, Primary Examiner

U.S. Cl. X.R.

195—80